US005784783A

United States Patent [19]

Carpenter

[11] Patent Number: 5,784,783

[45] Date of Patent: Jul. 28, 1998

[54] METHOD OF REMOVING AN INJECTOR SLEEVE

[76] Inventor: Donald L. Carpenter, 5294 Waterloo Rd., Burlington, Ky. 41005

[21] Appl. No.: 843,557

[22] Filed: Apr. 18, 1997

Related U.S. Application Data

[60] Provisional application No. 60/015,554 Apr. 18, 1996.

[51] Int. Cl.$^{6}$ .......... B23P 15/00

[52] U.S. Cl. .......... 29/888.011; 29/426.5

[58] Field of Search .......... 29/888.011, 888.021, 29/402.03, 426.4, 426.5, 426.6, 890.031

[56] References Cited

U.S. PATENT DOCUMENTS

| | | | |
|---|---|---|---|
| 3,685,132 | 8/1972 | Hodge | 29/888.011 |
| 4,353,234 | 10/1982 | Brothers et al. | 29/840.045 |
| 4,530,141 | 7/1985 | Vachon | 29/888.011 |
| 4,646,816 | 3/1987 | Rothstein | 29/840.031 |
| 4,967,468 | 11/1990 | Vossbrinck et al. | 29/840.031 |
| 5,101,559 | 4/1992 | Gelpi et al. | 29/890.031 |
| 5,117,548 | 6/1992 | Griffith et al. | 29/840.031 |
| 5,465,483 | 11/1995 | Fisk et al. | 29/840.031 |
| 5,664,328 | 9/1997 | Fisk et al. | 29/840.031 |

OTHER PUBLICATIONS

Special Instruction, Using the 127-3458 Sleeve Replacement Tool Group; Caterpillar; Oct. 1995.

*Primary Examiner*—Irene Cuda
*Attorney, Agent, or Firm*—Wood, Herron & Evans, L.L.P.

[57] ABSTRACT

An improved method and tool kit for removing injector sleeves from the cylinder head of engines includes inserting a pull plate below the upper rim of the injector sleeve. A post projects upwardly from the pull plate and extends from the bore hole in the cylinder head. The upper rim of the injector sleeve is then curled inwardly to relax the injector sleeve in the bore. Additionally, the curled upper rim of the injector sleeve provides a surface against which the pull plate can be pulled to thereby dislodge the injector sleeve from the bore for quick and efficient removal of the injector sleeve.

20 Claims, 2 Drawing Sheets

METHOD OF REMOVING AN INJECTOR SLEEVE

This is a continuation-in-part of U.S. provisional application Ser. No. 60/015,554 filed Apr. 18, 1996 which is hereby incorporated by reference.

BACKGROUND OF THE INVENTION

This invention relates to the removal of injector sleeves from internal combustion engines, and more particularly, to a tool kit and method for removing an injector sleeve from a diesel engine.

A cylinder head of a typical diesel engine includes a number of injector sleeves, each of which are securely fit within a cylinder head bore or injector bore. The injector sleeves are typically a soft metal such as copper or brass and are inserted into the injector bore and swedged to a tight friction fit. A coolant chamber surrounds a portion of the injector sleeve that is swedged in the bore to form a seal with the cylinder head so that a coolant can be circulated in the coolant chamber of the cylinder head and around the injector sleeve.

After extended use of the engine, the injector sleeve must be removed from the cylinder head and replaced with a new injector sleeve as a part of standard maintenance requirements. Additionally, in some instances the injector sleeve is damaged due to use or improper installation and may require premature removal and replacement.

To gain access to the injector sleeves seated within the cylinder head, partial disassembly of the engine is required. For example, portions, if not all, of the rocker arm assembly typically must be removed to gain access to the injector sleeves seated within the cylinder head. Because the disassembly of the rocker arm assembly is required for removal and replacement of the injector sleeves, it is common to remove and replace all of the injector sleeves, typically six in number, on the same engine at the same time. Even after the technician has gained access to the injector sleeves, they are often difficult to remove from the cylinder head because of the tight friction fit in the injector bore.

One known method and apparatus for removing the injector sleeves from the cylinder head is to cut or form threads on the internal circumference of the injector sleeve with a tool designed for this purpose. Once the tool is seated within the threads cut into the interior surface of the injector sleeve, the tool is pulled upwardly with the intention that the internal threads cut into the injector sleeve provide a sufficiently strong connection with the removal tool to dislodge the injector sleeve from the injector bore and thereby remove the injector sleeve.

However, due to the design of such a tool and method of removal, the formation of the internal threads on the inner surface of the injector sleeve results in the expansion of the injector sleeve within the bore thereby making an already tight friction fit between the injector sleeve and the bore even tighter. As a result, commonly the internal threads formed on the inner surface of the injector sleeve are stripped or scraped out during the removal process because the connection with the removal tool is not strong enough to dislodge the injector sleeve from the even tighter friction fit. Once this occurs, it is very difficult for the technician to repeat the procedure because of the damage to the injector sleeve. Based on the experience of the inventor of the present invention, the success rate of this known tool and method for removing injector sleeves is at best 1 out of 3. Furthermore, this known tool for removal of the injector sleeves is not adjustable such that the procedure cannot be repeated if the internal threads are stripped or scraped in an unsuccessful attempt for removal of the injector sleeve. As a result, the technician must commonly use a chisel or similar tool to chip away at the injector sleeve to thereby dislodge it piece by piece from the cylinder head for removal.

Due to the ineffectiveness of the above described tool and method for removing injector sleeves, the time required for the procedure is typically very substantial. Furthermore, unsuccessful attempts to remove the injector sleeve result in chiseling of the sleeve inside the bore. Such remedial procedures often result in damage to the bore which can ruin a cylinder head and require replacement of the entire cylinder head at a cost of many thousands of dollars.

Therefore, it is evident that there is a need for an improved tool and method for removing injector sleeves without damaging the cylinder head. Furthermore, the improved tool and method should offer the technician a quick and efficient removal of the injector sleeves which can be used on a variety of engine applications.

SUMMARY OF THE INVENTION

The present invention accomplishes these and other objectives and in one presently preferred embodiment includes inserting a pull plate into the injector sleeve below an upper rim thereof. Preferably, the pull plate has a post with an upper threaded portion attached thereto. The threaded portion of the post projects upwardly from the pull plate and injector sleeve and out of the injector bore.

After the pull plate is inserted into the injector sleeve, the upper rim of the injector sleeve is curled inwardly toward a centerline axis of the bore. Preferably, an elongate tubular cylinder or member is inserted into the injector bore to curl the injector sleeve rim. The lower edge of the tubular member includes a beveled surface which contacts the upper rim of the injector sleeve. The tubular member is driven downwardly onto the upper rim of the injector sleeve and the beveled surface curls the upper rim inwardly toward the centerline of the injector bore. The tubular member is then withdrawn from the injector bore and the pull plate is then pulled upwardly to contact the curled upper rim of the injector sleeve. Continued upward movement of the pull plate on the curled rim of the injector sleeve dislodges the injector sleeve from the injector bore so that the pull plate and injector sleeve can be removed. Once the pull plate and injector sleeve are dislodged from the injector bore, a pliers or other appropriate tool can be used by the technician to uncurl the upper rim of the injector sleeve around at least a part of the circumference of the injector sleeve for removal of the pull plate from the injector sleeve.

In a presently preferred embodiment, the pull plate is removed from the injector bore by the use of a pull bridge positioned on the cylinder head over the injector bore. The pull bridge includes a hole though which the threaded portion of the post projecting upwardly from the pull plate is inserted. A nut is threaded onto the post until it contacts the pull bridge so that continued rotation of the nut on the threaded portion of the post pulls the post, pull plate and injector sleeve upwardly from the injector bore.

It will be appreciated by one of ordinary skill in the art that the tool kit and method described herein is with reference to the removal of an injector sleeve from an injector bore of an internal combustion engine; however, the present invention may be readily used for other applications such as removal of work pieces lodged within a blind hole, bore or other opening.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
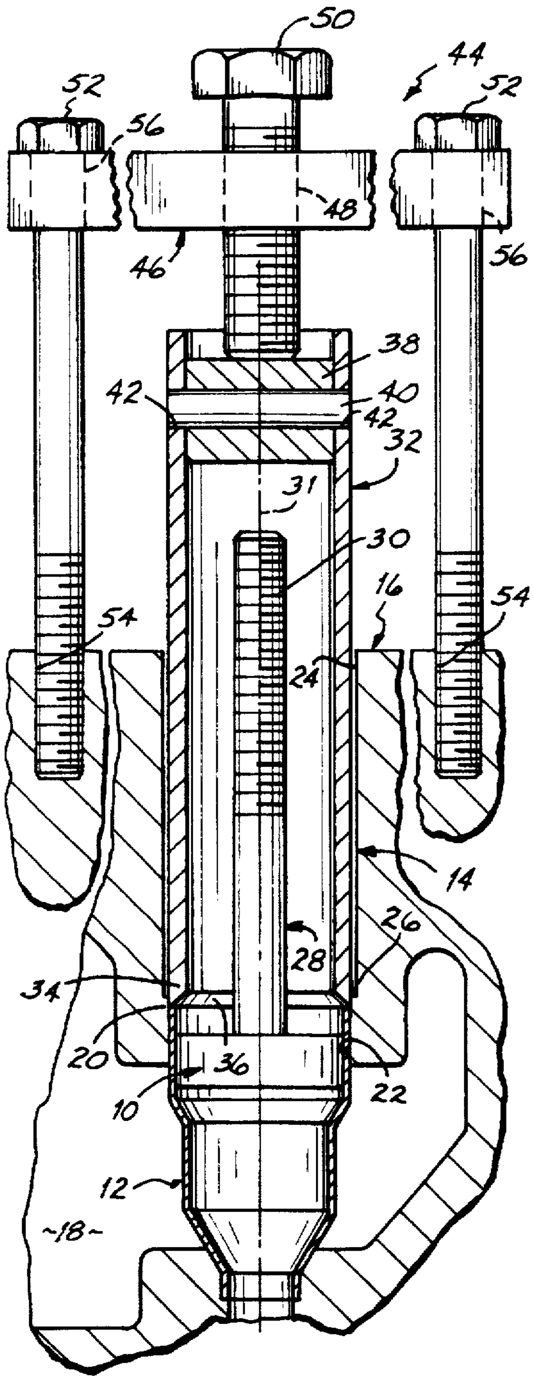
FIG. 1 is a cross-sectional view of a first presently preferred embodiment of components of a tool kit according to this invention installed onto a cylinder head of an engine for removal of an injector sleeve from the cylinder head.
Figure 2:
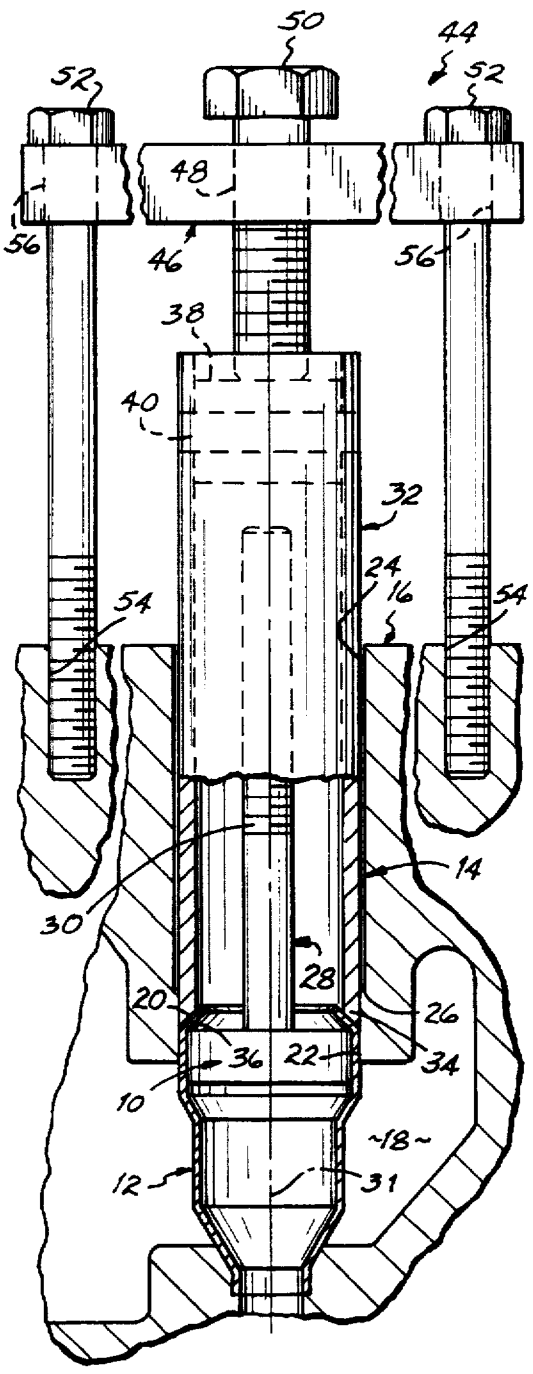
FIG. 2 is similar to FIG. 1 with a tubular member of the tool kit driven downwardly onto an upper rim of the injector sleeve to curl the upper rim inwardly and around a pull plate of the tool kit.

Referring to FIGS. 1 and 2, a first presently preferred embodiment of the present invention is shown in which a pull plate 10 has been inserted into an injector sleeve 12 seated within an injector bore 14 in a cylinder head 16 of an internal combustion engine. Although the present invention can be readily used for other applications and other engine designs, the presently preferred embodiments disclosed herein are with reference to a Caterpillar 3116–3126 (FIGS. 1–3) and 3176 (FIGS. 4–5) engines.

A middle portion of the injector sleeve 12 is surrounded by a coolant chamber 18 in the cylinder head 16. The removal of the injector sleeve 12 according to this invention typically entails partial disassembly of the engine including the removal of the rocker arm assembly (not shown) and/or intake manifold (not shown) as is readily understood by one of ordinary skill in the art.

The injector sleeve 12 includes an upper rim 20 and has a multi-section tapered configuration. The injector sleeve 12 is seated with a tight friction fit in a lower portion 22 of the injector bore 14 in the cylinder head 16. The injector bore 14 includes an upper portion 24 having a greater diameter than the lower portion 22 of the injector bore 14 so that a lip 26 is formed at the juncture between the upper and lower portions of the injector bore 14.

The pull plate 10 in a first presently preferred embodiment for use on the Caterpillar 3116–3126 engine has a generally circular disk-shaped configuration and is approximately ⅜" high and 1³⁄₁₆" in diameter for insertion below the upper rim and into the cavity of the uppermost portion of the injector sleeve 12.

A post 28 projects upwardly from the pull plate 10 and includes an upper threaded portion 30. The post 28 is preferably a ⅜" SH screw at least 3½" long and more preferably 4" long and projects along a centerline axis 31 of the pull plate 10. An elongate tubular member 32 having a generally cylindrical configuration is also included with the tool kit of the first presently preferred embodiment of this invention. The elongate tubular member 32 includes a lower edge 34 having an inwardly beveled surface 36 directed towards the centerline axis 31 of the tubular member 32. The beveled surface 36 preferably forms a 45° angle with respect to the centerline axis 31 of the tubular member 32 and extends around the entire circumference of the lower edge 34 of the tubular member 32. Preferably, the tubular member 32 has an outer diameter of 1³⁄₁₆" and a height of 4½". Preferably, the outer diameter of the tubular member 32 when inserted into the injector bore 14 fits within the diameter of the lower portion 22 of the injector bore 14 at or below the lip 26 thereof as shown in FIG. 1. Preferably, the tubular member 32 is 4130 steel which is hardened to 50 HR.

The upper end of the tubular member is closed with a disk-shaped striking plate 38 secured in a recessed position approximately ⅞" below the upper edge of the tubular member 32. The striking plate 38 is seated within the tubular member 32 and is held in place by a roll pin 40 extending through the striking plate 38 and seated within holes 42 in the cylindrical wall of the elongate tubular member 32.

When the elongate tubular member 32 is inserted into the bore hole 14, it rests upon the upper rim 20 of the injector sleeve 12 so that the post 28 projecting upwardly from the pull plate 10 seated within the injector sleeve 12 is inserted into the interior of the tubular member 32 as shown in FIGS. 1 and 2. The beveled edge 36 of the elongate tubular member 32 is useful to curl the upper rim 20 of the injector sleeve 12 inwardly toward the of the injector bore 14. To accomplish this, the elongate tubular member 32 must be driven downwardly, preferably a distance of ³⁄₁₆" onto the upper rim 20 of the injector sleeve 12. One way of driving the elongate tubular member 32 downwardly to curl the upper rim 20 is to use a drive plate assembly 44 secured to the cylinder head 16 as shown in FIGS. 1 and 2. Due to the limited access in many engine cylinder head areas, the 3116 Caterpillar engine in particular, access to the injector sleeves 12 is limited. Therefore, the drive plate assembly 44 is helpful to provide enough driving force on the elongate tubular member 32 to curl the upper rim 20 of the injector sleeve 12.

The drive plate assembly 44 includes a drive plate 46 having a central threaded aperture 48 therethrough with a bolt 50 threadably received therein. The drive plate assembly 44 also includes a number of bolts 52, preferably three, to secure the drive plate assembly 44 to the cylinder head 16. Preferably, the bolts 52 are threadably received in two exposed holes 54 used for attachment to the rocker arm assembly and one exposed hole for the intake manifold assemblies to the cylinder head 16. Therefore, the bolts 52 and associated holes 56 in the drive plate 46 for the bolts 52 are sized and configured to mate with the exposed holes 54 of the rocker arm assembly and intake manifold assemblies as will be readily understood by one of ordinary skill in the art. Preferably, at least three bolts 52 are used to secure the drive plate assembly 44 to the cylinder head 16, although only two bolts are shown in FIGS. 1 and 2.

With the pull plate 10 inserted into the injector sleeve 12 and the elongated member 32 inserted into the bore hole 14 with the beveled edge 36 resting atop the rim 20 of the injector sleeve 12, the drive plate assembly 44 is secured to the cylinder head 16 as shown in FIGS. 1 and 2. The bolt 50 is then rotated downwardly in the threaded aperture 48 of the drive plate 46 until the bolt 50 contacts the striking plate 38 of the elongate member 32. Continued rotation of the bolt 50 drives the elongate member 32 downwardly, preferably about ³⁄₁₆" so that the beveled edge 36 of the elongate member 32 curls the upper rim 20 of the injector sleeve 12 inwardly toward the centerline axis 31. Advantageously, the action of the elongate member 32 on the injector sleeve 12 urges the injector sleeve 12 away from the walls of the bore hole 14 without increasing the friction fit relationship and thereby complicating the removal process as with known prior art techniques and tools. Driving the elongate member 32 downwardly onto the upper rim 20 of the injector sleeve 12 relaxes the sleeve 12 in the bore 14 and likewise curls the upper rim 20 of the injector sleeve 12.

Figure 3:
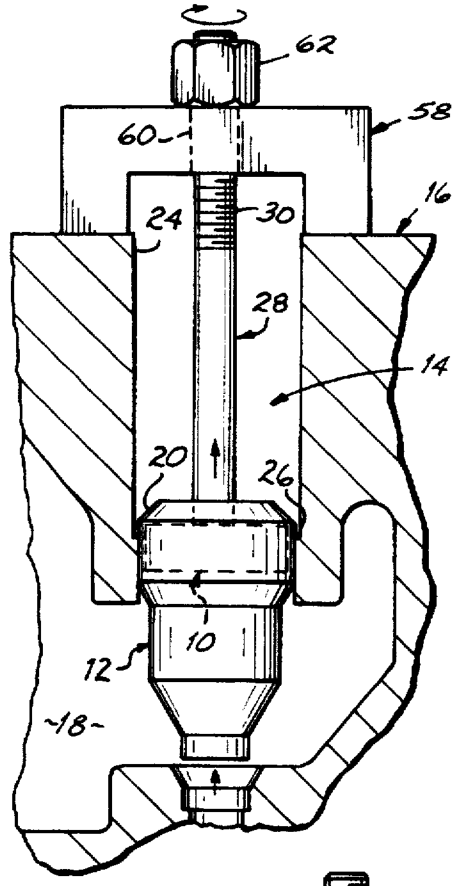
FIG. 3 is a cross-sectional view of a pull bridge mounted on the cylinder head for removing the pull plate and injector sleeve from the cylinder head.

After the bolt 50 has driven the elongate member 32 downwardly to curl the upper rim 20 of the injector sleeve 12, the elongate member 32 and drive plate assembly 44 are removed from the cylinder head 16 thereby exposing the post 28 connected to the pull plate 10 which projects upwardly from the bore hole 14. Referring to FIG. 3, the removal of the injector sleeve 12 and pull plate 10 from the bore hole 14 is accomplished according to a presently preferred embodiment of this invention with a generally U-shaped pull bridge 58. The pull bridge 58 includes an opening 60 through which the threaded portion 30 of the post 28 projects. The pull bridge 58 is seated on the upper surface of the cylinder head 16 to span the bore hole 14 and a nut 62 is threadably mounted on the threaded portion 30 of the post 28 atop the pull bridge 58 as shown in FIG. 3. Rotation of the nut 62 on the threaded portion 30 pulls the post 28 and pull bridge 58 connected thereto upwardly until the pull plate 10 contacts the curled upper rim 20 of the injector sleeve 12. The nut 62 threadably received on the post 28 is preferably an 11/16"×3/8" nut. Axial movement of the threaded nut 62 is limited by the pull bridge 58 so that continued rotation of the nut 62 on the threaded portion of the post 28 pulls the post 28 and pull plate 10 upwardly to thereby dislodge the injector sleeve 12 from the injector bore 14 as a result of the contact between the pull plate 10 and the curled rim 20 of the injector sleeve 12. Removal of the injector sleeve 12 and pull plate 10 from the injector bore 14 is easily accomplished without damage to the injector bore 14 or cylinder head 16. Furthermore, if the curled rim 20 of the injector sleeve 12 opens up, fails or breaks as the pull plate 10 is being pulled upwardly by the pull bridge 58 as shown in FIG. 3, the procedure of curling the upper rim 20 as shown and described with reference to FIGS. 1 and 2 can be repeated without damage to the injector bore 14 and the removal of the pull plate 10 and injector sleeve 12 with the pull bridge 58 as shown in FIG. 3 can be attempted again until the injector sleeve 12 is dislodged from the injector bore 14.

Figure 4:
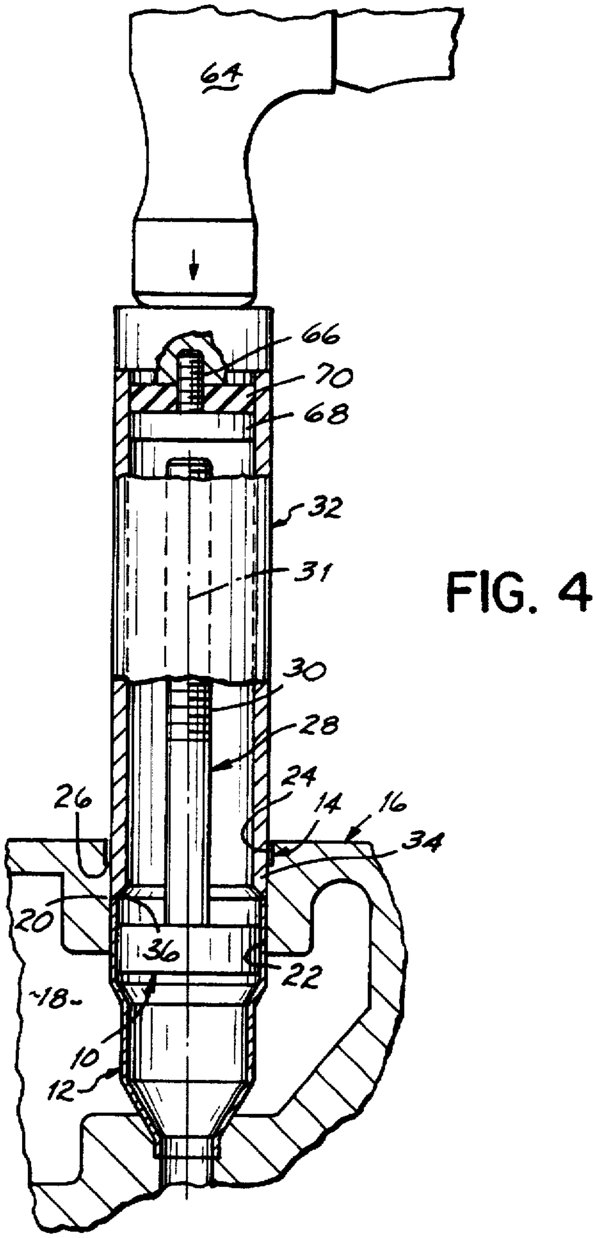
FIG. 4 is a cross-sectional view of a second presently preferred embodiment of components of the tool kit of the invention.
Figure 5:
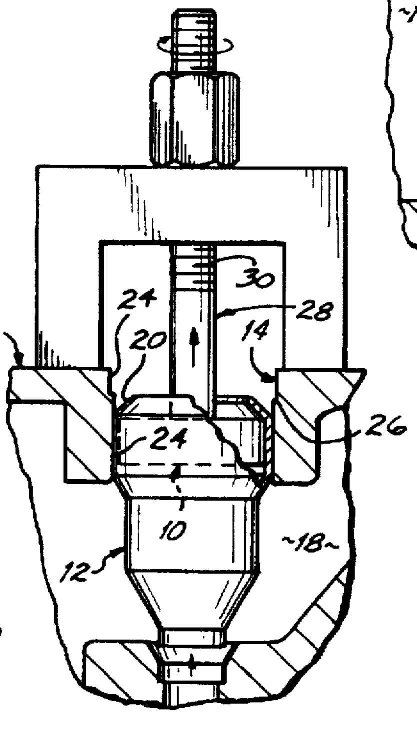
FIG. 5 is a view of the second presently preferred embodiment of this invention being used to remove a pull plate and injector sleeve from the injector bore of the cylinder head.

A second presently preferred embodiment of the invention which is particularly adapted for the 3176 Caterpillar engine, is shown in FIGS. 4 and 5, with similar reference numerals used to indicate similar elements with respect to the first presently preferred embodiment of the invention shown in FIGS. 1–3. The configuration of the 3176 engine provides the technician greater access to the injector bore 14 once the rocker assembly (not shown) and/or intake manifold (not shown) are removed so that the drive plate assembly 44 shown and described with reference to the first presently preferred embodiment is not required. Alternatively, a tool 64 such as a hammer or other instrument can be used to provide the driving force on the elongate tubular member 32 to curl the upper rim 20 of the injector sleeve; 12. Preferably, the elongate tubular member 32, according to the second presently preferred embodiment of the invention, has an outer diameter of approximately 1½" and an axial total length of approximately 5¾". Further, due to the method of using the hammer 64 to drive the elongate member 32 downwardly, the striking plate **38*a* capping the upper end of the elongate tubular member 32 is threadably mounted on a threaded post 66 extending upwardly from a mount 68 seated within the elongate tubular member 32. Preferably, the striking plate 38*a*** is 1½" round and ½" thick.

Sandwiched between an upper surface of the mount 68 and a lower surface of the striking plate **38*a* is a vibration dampener 70, preferably hard rubber plug, to minimize and dampen the shock when the elongate member 32 is driven downwardly by the repeated blows of the hammer 64 on the striking plate 38*a***.

Preferably, the post 28 projecting upwardly from the pull plate 10 in the second presently preferred embodiment of the invention is at least 3½" in length and the pull plate 10 is approximately 1¼" in diameter so that it can be inserted into the injector sleeve 12 and below the upper rim 20 thereof.

From the above disclosure of the general principles of the present invention and the preceding detailed description of preferred embodiments, those skilled in the art will readily comprehend the various modifications to which this invention is susceptible. It will be readily understood by one of ordinary skill in the art that the present invention can be used for the removal of injector sleeves on other engine designs and for the removal of other work pieces lodged within bores or the like. Therefore, I desire to be limited only by the scope of the following claims and equivalents thereof.

I claim:

1. A method of removing an injector sleeve from an injector bore of an engine, the method comprising the steps of:

inserting a pull plate into the injector sleeve and past a rim of the injector sleeve;

curling at least a portion of the rim of the injector sleeve inwardly toward a centerline axis of the injector sleeve; and removing the pull plate from the injector bore of the engine so that the inwardly curled portion of the rim of the injector sleeve contacts the pull plate to thereby dislodge the injector sleeve from the injector bore and the injector sleeve is removed from the injector bore along with the pull plate.

2. The method of claim 1 wherein the curling step further comprises:

inserting an elongate member into the injector bore until an edge of the elongate member contacts the rim of the injector sleeve, the edge of the elongate member having a beveled surface; and driving the elongate member onto the injector sleeve so that the beveled surface curls the rim of the injector sleeve.

3. The method of claim 2 wherein the driving step further comprises:

striking the elongate member with a tool.

4. The method of claim 2 wherein the driving step further comprises:

mounting a drive plate relative to the injector bore, the drive plate having a threaded aperture; and rotationally inserting a threaded member into the threaded aperture of the drive plate until the threaded member contacts a striking surface of the elongate member so that continued rotation of the threaded member drives the beveled surface onto the rim of the injector sleeve.

5. The method of claim 4 wherein the mounting step further comprises:

exposing selected threaded holes in the engine proximate the injector bore;

inserting threaded bolts which are connected to the drive plate into the exposed selected threaded holes to limit movement of the drive plate in a direction opposite from the injector sleeve.

6. The method of claim 1 wherein the removing step further comprises:

pulling a post connected to the pull plate from the injector bore.

7. The method of claim 6 wherein the removing step further comprises:

mounting a pull bridge relative to the injector bore, the pull bridge having an opening;

inserting the post into the opening in the pull bridge; and rotating a threaded nut onto a threaded portion of the post until axial movement of the nut is limited by the pull bridge so that continued rotation of the nut on the threaded portion of the post dislodges the pull plate and the injector sleeve from the injector bore.

8. A method of removing an injector sleeve from an injector bore of an engine, the method comprising the steps of:

inserting a pull plate into the injector sleeve and past a rim of the injector sleeve, a post having a threaded portion being connected to the pull plate and projecting out of the injector bore;

inserting a tubular member into the injector bore until an edge of the tubular member contacts the rim of the injector sleeve, the edge of the tubular member having a beveled surface;

curling at least a portion of the rim of the injector sleeve inwardly toward a centerline axis of the injector sleeve by driving the tubular member onto the injector sleeve;

removing the tubular member from the injector bore;

mounting a pull bridge relative to the injector bore, the pull bridge having an opening;

inserting the post into the opening in the pull bridge; and rotating a threaded nut onto the threaded portion of the post until axial movement of the nut is limited by the pull bridge so that continued rotation of the nut on the threaded portion of the post pulls the pull plate into contact with the curled rim of the injector sleeve to thereby dislodge the injector sleeve from the injector bore and the injector sleeve is removed from the injector bore along with the pull plate.

9. The method of claim 8 wherein the curling step further comprises:

striking the elongate member with a tool.

10. The method of claim 8 wherein the curling step further comprises:

mounting a drive plate relative to the injector bore, the drive plate having a threaded aperture; and rotationally inserting a threaded member into the threaded aperture of the drive plate until the threaded member contacts a striking surface of the elongate member so that continued rotation of the threaded member drives the beveled surface onto the rim of the injector sleeve.

11. The method of claim 10 wherein the mounting step further comprises:

exposing selected threaded holes in the engine proximate the injector bore;

inserting threaded bolts connected to the drive plate into the exposed selected threaded holes to limit movement of the drive plate in a direction opposite from the injector sleeve.

12. A method of removing a workpiece lodged in a bore hole in which the workpiece has a cavity surrounded by a rim, the method comprising the steps of:

inserting a pull plate into the cavity of the workpiece and past the rim of the workpiece;

curling at least a portion of the rim toward the cavity; and removing the pull plate from the bore hole so that the curled portion of the rim of the workpiece contacts the pull plate to thereby dislodge the workpiece from the bore hole and the workpiece is removed from the bore hole along with the pull plate.

13. The method of claim 12 wherein the curling step further comprises:

inserting an elongate member into the bore hole until an edge of the elongate member contacts the rim of the workpiece, the edge of the elongate member having a beveled surface; and driving the elongate member onto the workpiece so that the beveled surface curls the rim of the workpiece.

14. The method of claim 13 wherein the driving step further comprises:

striking the elongate member with a tool.

15. The method of claim 13 wherein the driving step further comprises:

mounting a drive plate relative to the bore hole, the drive plate having a threaded aperture; and rotationally inserting a threaded member into the threaded aperture of the drive plate until the threaded member contacts a striking surface of the elongate member so that continued rotation of the threaded member drives the beveled surface onto the rim of the workpiece.

16. The method of claim 12 wherein the removing step further comprises:

pulling a post connected to the pull plate from the bore hole.

17. The method of claim 16 wherein the removing step further comprises:

mounting a pull bridge relative to the bore hole, the pull bridge having an opening;

inserting the post into the opening in the pull bridge; and rotating a threaded nut onto a threaded portion of the post until axial movement of the nut is limited by the pull bridge so that continued rotation of the nut on the threaded portion of the post dislodges the pull plate and the workpiece from the bore hole.

18. A method of removing a workpiece lodged in a bore hole in which the workpiece has a cavity surrounded by a rim, the method comprising the steps of:

inserting a pull plate into the cavity and past the rim of the workpiece, a post having a threaded portion being connected to the pull plate and projecting out of the bore hole;

inserting a tubular member into the bore hole until an edge of the tubular member contacts the rim of the workpiece, the edge of the tubular member having a beveled surface;

curling at least a portion of the rim of the workpiece inwardly toward a centerline axis of the bore hole by driving the tubular member onto the workpiece;

removing the tubular member from the bore hole;

mounting a pull bridge relative to the bore hole, the pull bridge having an opening;

inserting the post into the opening in the pull bridge; and rotating a threaded nut onto the threaded portion of the post until axial movement of the nut is limited by the pull bridge so that continued rotation of the nut on the threaded portion of the post pulls the pull plate into contact with the curled rim of the workpiece to thereby dislodge the workpiece from the bore hole and the workpiece is removed from the bore hole along with the pull plate.

19. The method of claim 18 wherein the curling step further comprises:

striking the elongate member with a tool.

20. The method of claim 18 wherein the curling step further comprises:

mounting a drive plate relative to the bore hole, the drive plate having a threaded aperture; and rotationally inserting a threaded member into the threaded aperture of the drive plate until the threaded member contacts a striking surface of the elongate member so that continued rotation of the threaded member drives the beveled surface onto the rim of the workpiece.

* * * * *